US010776321B1

(12) United States Patent
Balcha et al.

(10) Patent No.: US 10,776,321 B1
(45) Date of Patent: Sep. 15, 2020

(54) SCALABLE DE-DUPLICATION (DEDUPE) FILE SYSTEM

(71) Applicant: Trilio Data, Inc., Framingham, MA (US)

(72) Inventors: Muralidhara R. Balcha, Upton, MA (US); Giridhar Basava, Sammamish, WA (US); Sanjay Baronia, Grafton, MA (US)

(73) Assignee: Trilio Data, Inc., Framingham, MA (US)

( * ) Notice: Subject to any disclaimer, the term of this patent is extended or adjusted under 35 U.S.C. 154(b) by 815 days.

(21) Appl. No.: 14/562,973

(22) Filed: Dec. 8, 2014

Related U.S. Application Data

(60) Provisional application No. 61/913,294, filed on Dec. 7, 2013.

(51) Int. Cl.
*G06F 17/00* (2019.01)
*G06F 7/00* (2006.01)
*G06F 16/174* (2019.01)
*G06F 16/22* (2019.01)
*G06F 16/27* (2019.01)

(52) U.S. Cl.
CPC ......... *G06F 16/1752* (2019.01); *G06F 16/22* (2019.01); *G06F 16/278* (2019.01)

(58) Field of Classification Search
CPC ......... G06F 17/30159; G06F 17/30312; G06F 17/30584
USPC .................................................... 707/692
See application file for complete search history.

(56) References Cited

U.S. PATENT DOCUMENTS

| | | | | |
|---|---|---|---|---|
| 5,537,573 A * | 7/1996 | Ware | .................. | G06F 12/0862 711/137 |
| 6,810,398 B2 * | 10/2004 | Moulton | ............... | G06F 16/137 707/999.006 |
| 7,065,619 B1 * | 6/2006 | Zhu | ..................... | G06F 11/1453 707/999.201 |
| 7,143,251 B1 * | 11/2006 | Patterson | ............ | G06F 16/1744 711/162 |
| 7,424,498 B1 * | 9/2008 | Patterson | ............ | G06F 12/0253 707/999.102 |
| 7,451,168 B1 * | 11/2008 | Patterson | ............ | G06F 12/0269 707/999.104 |
| 7,519,635 B1 * | 4/2009 | Haustein | ............. | G06F 16/1752 707/999.204 |
| 7,539,710 B1 * | 5/2009 | Haustein | ............. | G06F 11/1453 707/999.204 |

(Continued)

*Primary Examiner* — Pavan Mamillapalli
(74) *Attorney, Agent, or Firm* — Goodwin Procter LLP

(57) ABSTRACT

A scalable de-duplication file system divides the file system into data and metadata stores where each store is built on scale out architectures. Each store is not a single module, but a collection of identical modules that together creates one large store. By scaling metadata store and chunk store, the file system can be scaled linearly without compromising the file system performance. Deduplication logic identifies a chunk location for each stored chunk, and stores, for each identifier, an index of the chunk location associated with the corresponding identifier, such that the stored index for similar chunk ids points to the same chunk location. In this manner, duplicate chunks or blocks of data are referenced merely by pointer or indexes, rather than redundantly duplicating storage for each instantiation or copy of similar data.

19 Claims, 7 Drawing Sheets

(56) References Cited

U.S. PATENT DOCUMENTS

| | | | | |
|---|---|---|---|---|
| 7,567,188 | B1* | 7/2009 | Anglin | G06F 3/0608 |
| | | | | 341/63 |
| 7,747,584 | B1* | 6/2010 | Jernigan, IV | G06F 16/1748 |
| | | | | 707/692 |
| 8,108,353 | B2* | 1/2012 | Balachandran | H03M 7/3084 |
| | | | | 707/664 |
| 8,140,821 | B1* | 3/2012 | Raizen | G06F 11/1448 |
| | | | | 707/637 |
| 8,447,741 | B2* | 5/2013 | Reiter | G06F 11/1453 |
| | | | | 707/692 |
| 8,489,611 | B2* | 7/2013 | Tofano | G06F 7/00 |
| | | | | 707/741 |
| 8,972,672 | B1* | 3/2015 | Wallace | G06F 3/0641 |
| | | | | 707/693 |
| 9,208,820 | B2* | 12/2015 | Constantinescu | G11B 27/032 |
| 9,268,806 | B1* | 2/2016 | Kesselman | G06F 17/30312 |
| 9,367,557 | B1* | 6/2016 | Lin | G06F 16/1744 |
| 2012/0310889 | A1* | 12/2012 | McNeil | H04L 67/2857 |
| | | | | 707/639 |
| 2014/0006363 | A1* | 1/2014 | Constantinescu | G11B 27/032 |
| | | | | 707/692 |

* cited by examiner

SCALABLE DE-DUPLICATION (DEDUPE) FILE SYSTEM

RELATED APPLICATIONS

This patent application claims the benefit under 35 U.S.C. § 119(e) of U.S. Provisional Patent App. No. 61/913,294, filed Dec. 7, 2013, entitled "METHOD AND APPARATUS OF IMPLEMENTING A SCALE OUT DE-DUPLICATION FILE SYSTEM," incorporated by reference in entirety.

BACKGROUND

De-duplication (dedupe) in the computer industry is a process of eliminating redundant data in a file system in order to save storage and its management costs. There are numerous implementations of de-duplication file systems in the industry each with its own advantages. However all of these implementations separate file data into metadata and actual data of fixed size called chunks. These implementations differ on how the mapping of the file metadata to chunk store is managed. Any file system that supports de-duplication must present a consistent file system abstraction to applications. Conventional approaches also vary in terms of scale, elasticity, and performance of these file systems.

SUMMARY

A storage environment having files defined as a sequence of chunks defining a portion of data in the file performs storage and deduplication of similar chunks by subdividing the file into a sequence of chunks, and computing an identifier for each chunk to generate a sequence of identifiers such as hashes, such that each of the identifiers is unlikely to have a similar value for a chunk of dissimilar contents. Deduplication logic stores each unique chunk value in a chunkstore or other suitable memory, in which the chunkstore is defined by a memory region for storing portions of the file and may be either volatile or non-volatile, or a combination thereof. The deduplication logic identifies a chunk location for each stored chunk, and stores, for each identifier, an index of the chunk location associated with the corresponding identifier, such that the stored index for similar chunk ids points to the same chunk location. In this manner, duplicate chunks or blocks of data are referenced merely by pointers or indices, rather than redundantly duplicating storage for each instantiation or copy of similar data.

Configurations herein depict a deduplication file system suitable for use in conjunction with a host computing system (host) for providing non-volatile mass storage to the host. The host may be any suitable computing system, such as a mobile device, tablet, laptop desktop or other portable or generally stationary device or set of interconnected devices suitable for loading and executing application for providing computing services to a user. In a particular arrangement, the deduplication (dedupe) approaches disclosed herein are particularly applicable to a backup or archive application, as such applications often encounter duplicate data, however the disclosed approach is also suitable for environments having active file support where files may undergo frequent updates.

In a particular implementation depicted further below, a file system operates with units or portions of data sent between the host and the files managed by the file system. Conventional file systems often employ units of data for exchange between a host and a supporting mass storage system. Such units often have a fixed size, and may be referred to by many labels, such as blocks, sectors, segments, packet, buffers, encapsulations, strings, stripes, and others. In discussions herein, such a unit or portion of date is referred to as a chunk, depicting a sequential set of data bytes for exchange with the host and for comparison with other chunks in the file system, and fulfill the designated operations when referred to by other labels.

Chunk stores are data stores that store millions to billions of individual chunks of data. These chunks are fixed size data blocks, typically 4 k. Each individual chunk in the data store is fetched based on the message digest of the chunk data. A message digest can be any hash function applied on the chunk data. The most popular hash function used in data duplication is SHA1, which result in a 160 bit or 20 bytes of message digest. Numerous lookup algorithms are available for hash usage. Some approaches are optimized to store message digests, referred to in the disclosed approach as a chunk id on flash storage. Since flash storage by its very nature perform well for random access reads and log type writes, these algorithms are specifically designed to perform efficiently with flash storage. These algorithms differ in terms of memory footprint per chunk ID and number of flash reads it takes to look up a particular chunk ID.

Chunk stores can be limited to one volume or one computer system or can be spread across multiple systems, volumes or nodes. When chunks are distributed across multiple systems, a simple hash similar to (mod n) where n is the number of computer systems is performed on the chunk id to identify the system where the chunk can be stored. The mod operation results in the system index on which the chunk should be allocated. This simple approach works very well as long as the number of nodes remains unchanged. However the cloud is anything but unchanged. The very nature of the cloud is elasticity and hence the de-duplication file systems need to grow or shrink in accordance with the cloud. The operand of mod is number of nodes in the system, when number of node changes the operand to compute the chunk id node changes. This may tend to invalidate previous chunk allocations. In order to fix all chunk id to new nodes in the new system takes enormous amount of data transfer between the nodes. Besides the data transfer, the algorithms to determine what chunks to move while still servicing chunk lookups and allocations are complex and very difficult to test.

Alternate configurations of the invention include a multiprogramming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In a storage environment having files defined as a sequence of chunks, such that each chunk defines a portion of data in the file, a method of storing data involves subdividing the file into a sequence of chunks, and computing an identifier for each chunk to generate a sequence of identifiers, such that each of the identifiers unlikely to have a similar value for a chunk of dissimilar contents. Each identifier, referred to as a chunk ID, may be a hash such as SHA1, MD4, MD5 or other suitable hash as is known in the art. Deduplication (dedupe) logic stores each unique chunk value in a chunkstore defined by a memory region for storing portions of the file, and identifies a chunk location for each stored chunk. The dedupe logic stores, for each identifier, an index of the chunk location associated with the corresponding identifier. The dedupe logic further includes removing duplicate chunks by comparing the identifier for each chunk with the identifiers of previously stored chunks to identify chunks having the same value, and storing an index to the same chunk from each of the similar identifiers. Therefore, the stored index for similar chunk ids points to the same chunk location to avoid duplicating storage for similarly valued chunks.

Configurations below depict an example of processing in conjunction with a host for receiving and fulfilling read and write request. The disclosed file system also performs rebalancing across host nodes for achieving wear leveling, particularly with flash (non rotary) storage mediums. A plurality of physical storage devices each define a storage node (node) for serving the host, and each storage node is further subdivided into logical volumes for satisfying I/O requests. In the example shown, each physical node (and hence, each logical volume) includes a portion of flash (solid state) memory for low-latency operations, and a portion of rotary or disk memory where higher latency is acceptable, and are invoked as described below. Alternatively, the method and operations disclosed are operable on an entirely rotary or entirely flash/solid state configuration.

Figure 1:
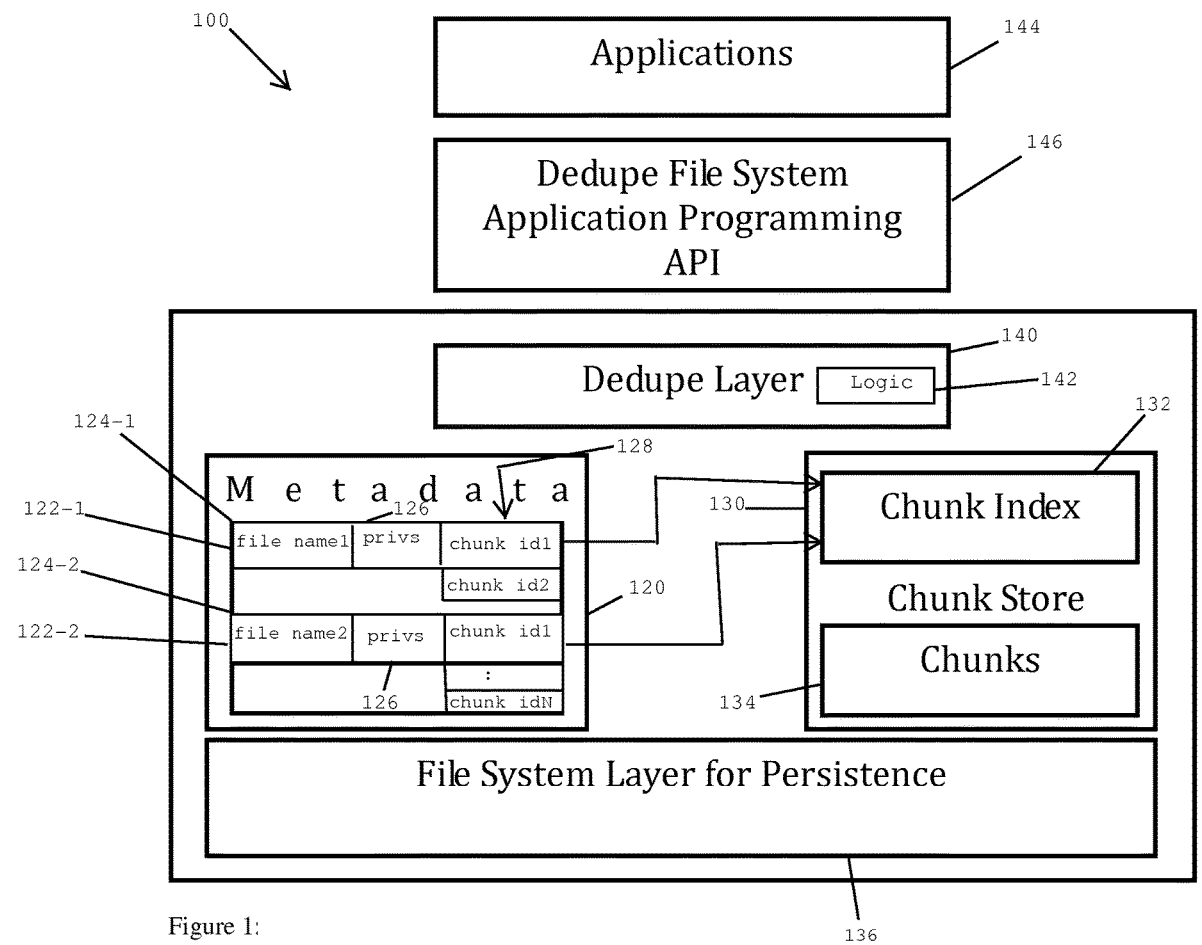
FIG. 1 is an architecture diagram showing a context of computing environment suitable for use with configurations disclosed herein.

FIG. 1 is an architecture diagram showing a context of computing environment 100 suitable for use with configurations disclosed herein. The disclosed implementation of the scale-out de-duplication file system 110 contains three basic building blocks as shown in FIG. 1. A metadata module 120 stores header information about each file. A chunkstore 130 comprises flash storage 132 for indexing and a hard disk region 134 for storing the chunks of data. A de-duplication layer 140 module includes dedupe logic 142 that is responsible for preserving the file semantics to an application layer 144 but leverages the metadata module 120 and chunkstore 130 to implement de-duplication functionality and operations for manipulating the duplicated data, disclosed further in FIG. 2. An API 146 provides a toolkit and front end to the dedupe layer 140 for invoking particular I/O services via function calls from the applications 144. A native file system layer 136 performs physical transport and storage of the referenced chunks, and may be fulfilled by any suitable set of OS (Operating System) supported functions.

Configurations disclosed herein emphasize scalability. The file system is implemented using one or more of these three modules 120, 130 and 140. The file system can be implemented starting with one of each and when the file system need to grow larger, additional instances of these modules are added to the file system. Since these modules are not tied to a particular hosting platform or node, these modules can reside on a single node or spread across multiple nodes.

A particular method of implementing the de-duplication file system as disclosed herein includes separation of file into metadata and chunks where the file data is divided into fixed number of chunks and a message digest (hash) of each chunk is stored in the metadata. The message digest of the chunk can be calculated using well-known algorithms including but not limited to SHA1, SHA256 or SHA512. The approach includes storing the metadata of the file as a named file that bears the actual file name and is stored in the same directory structure as the actual file would have been saved, bears same access permissions and ownership, and storing chunks in a global chunk store. The global chunk store 130 is comprised of one or more virtual files called chunkstore files. Each chunkstore file includes an index file 132 and a chunk file 134. The index file is stored on a low latency storage systems such as flash storage. The chunk file is stored on a hard disk or on a flash storage. The index file contains a sorted list of chunk ids of the chunks stored in corresponding chunk file. The index is managed by flash optimized indexing algorithms that has low read/write amplification. Allocation of chunks are managed by its own chunk file using a free bitmap. Each chunk file includes a journal for preserving the consistency of chunk allocation and for enhancing performance.

Figure 2:
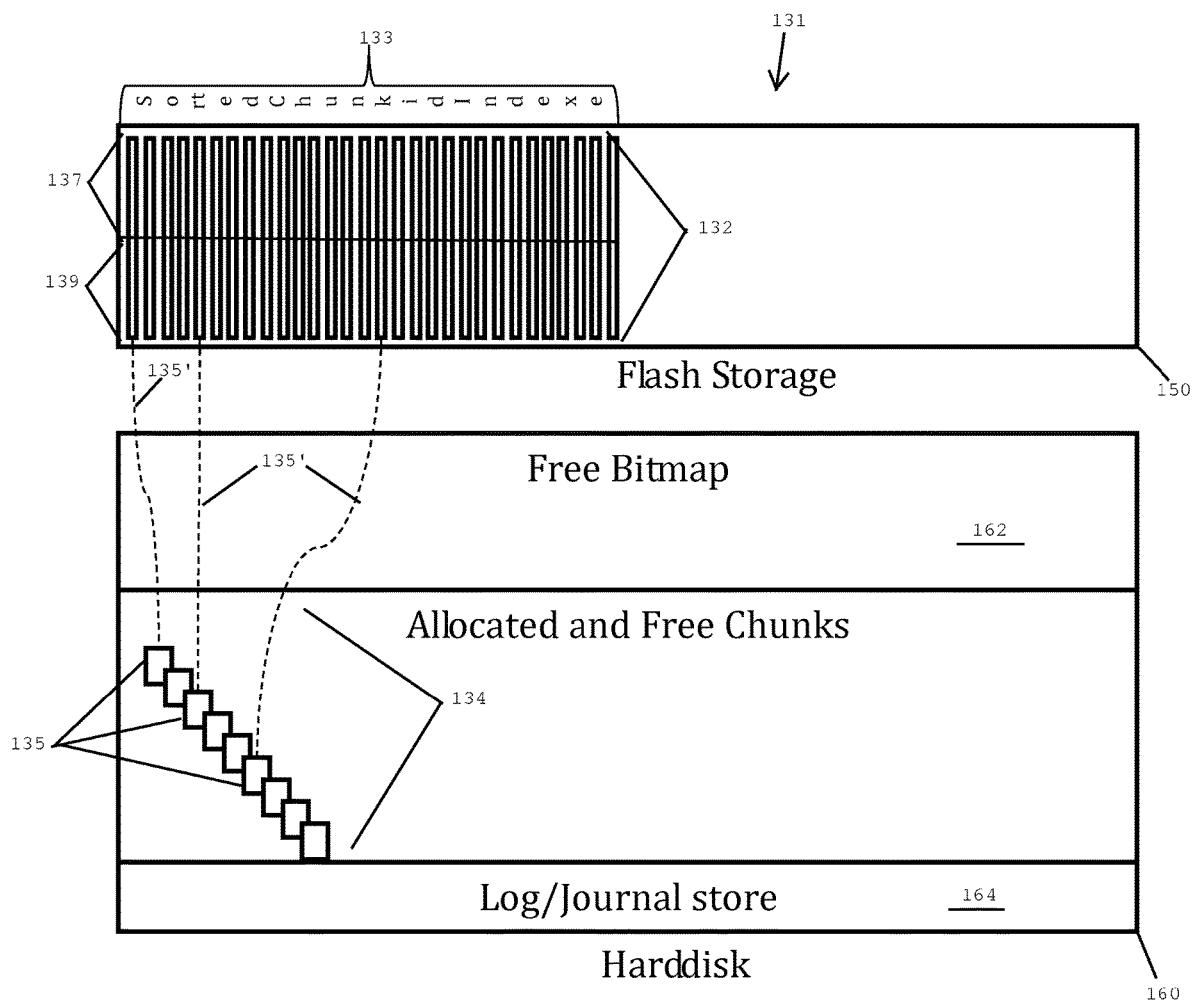
FIG. 2 is a diagram of the chunk store of FIG. 1.

FIG. 2 shows a diagram of the chunk store of FIG. 1. Referring to FIGS. 1 and 2, in the example configuration disclosed, flash storage 150 stores the chunk index 132, and harddisk storage 160 stores the chunks 134, along with a bitmap 162 of available chunks and a log/journal store 164 for recovery and other system tasks.

Each file 124-1 . . . 124-2 (124, generally) in the file system 100 is divided into metadata 122 and chunks 134. The metadata 122 of the file resides in the metadata module 120 in the form of a file 124-N. The metadata file 124 assumes the personality of the file. It has the same name as the file and resides in the same directory structure as the file itself. The ownership and the access control 126 of the actual file are applied to the metadata file. The metadata file 124 does not contain the actual data, instead it contains a sequence 128 of chunk ids or the message digests of the actual data. The actual data is divided into fixed size chunks 134 and resides in the chunk store 130.

Figure 3:
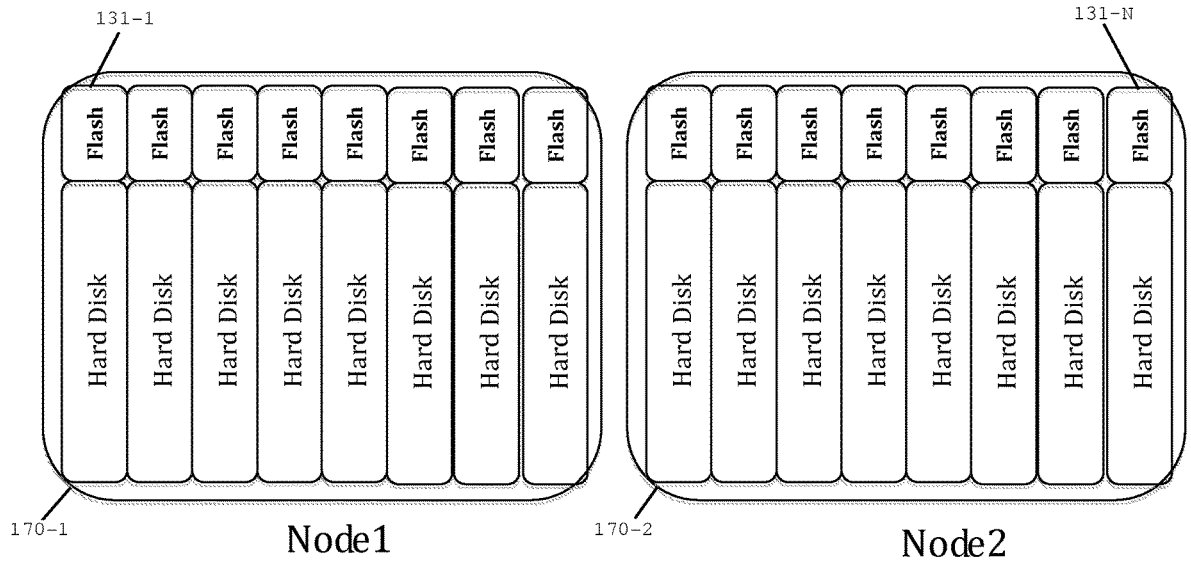
FIG. 3 is a diagram of storage allocation in the chunk store of FIG. 2.

Referring to FIGS. 2 and 3, the chunkstore 130 is a global store for storing the chunks 134, and is made up of one or more virtual files called chunk files 131-1 . . . 131-N (131 generally). Each virtual file 131 has two components: a physical file that resides on the flash store 150 and another physical file that resides on the hard disk storage 160. The file that resides on the flash store 150 is the index file 133 as it contains chunk ids 137 indexed by one of the flash optimized indexing algorithms. The file on the hard disk storage 160 is called chunk store file 135 and contains all the chunks that were indexed in the chunk id file. We assume that flash store 150 and hard disk storage 160 are formatted using one of well-known file systems, such as a posix compliant file system, however any suitable file system may be employed. The chunk id file is therefore an index of (chunk id 137, chunk location 139) tuples. The chunk location 139 identifies the offset or location of the corresponding chunk 135 in the chunk store file 134, as shown by pointers 135'. The chunk store file 134, therefore, contains all available chunks, and a particular file 122 includes a sequence of specific chunks 135, as pointed or referenced from the indices 139 corresponding to the hashes 137 matching the chunk ids 128 from the metadata.

In the example configuration, the chunkstore 130 for actual data storage has a latency greater than the metadata containing the file and chunk ID sequences, typically represented by rotational or hard disk memory and NAND or flash memory, respectively. Each of the chunks define a similarly sized portion of the file and are arranged sequentially to compose the contents of the file as referenced by the metadata.

Figure 4:
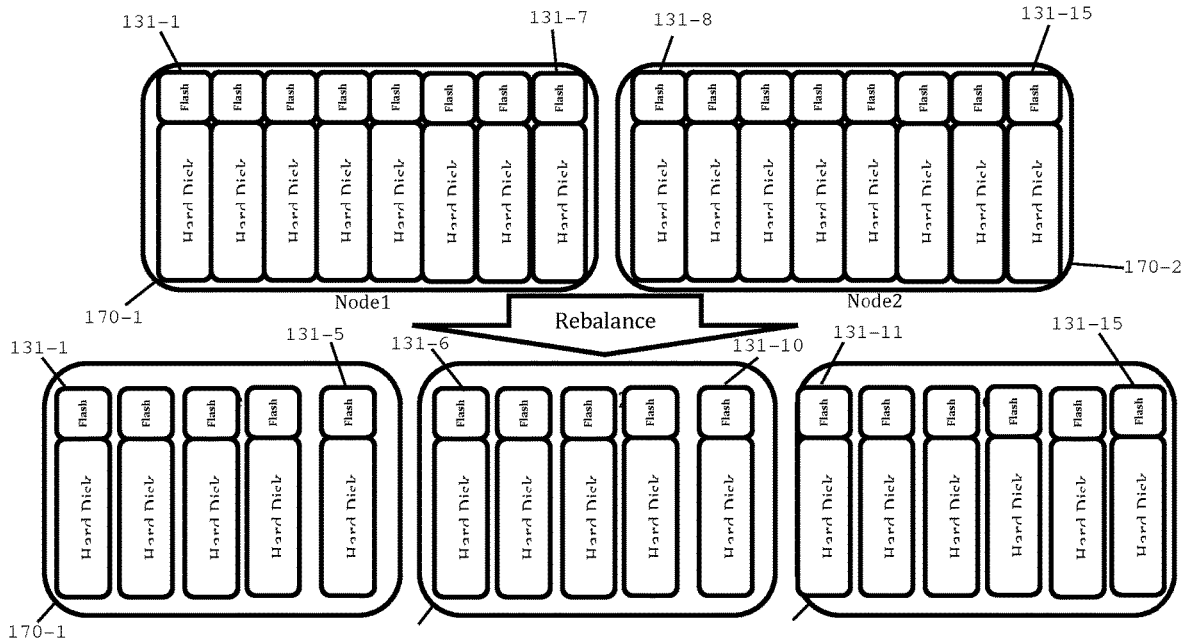
FIG. 4 shows rebalancing of the storage allocation of FIG. 3.

FIG. 3 is a diagram of storage allocation in the chunk store of FIG. 2, and FIG. 4 shows rebalancing of the storage allocation of FIG. 3. As indicated above, the number of virtual chunk files 131-1 . . . 131-N (131 generally) is independent from the number of physical storage volumes 170-1 . . . 170-2 (170 generally). Each chunk file 135 is pre-created with a fixed size when the dedupe file system is initialized. The size of the chunk file and the number of files are determined by the number of nodes in the system and how large the dedupe file system expected to grow. The chunk id 132 file and chunk store files 134 are proportional to each other. In the example configuration, since the chunked 137 is a 20-byte message digest on a 4096 bytes chunk, the chunk file is usually 1/170 of chunk store. The number of chunk files 131 is usually fixed during the lifetime of the file system. In FIG. 4, a storage volume is added, and the chunk files 131 redistributed from volumes 170-1 . . . 170-2 to 170'-1 . . . 170'-3. The dedupe logic 142 identifies or selects a chunk file 131 by a function independent of the number of storage volumes when creating new files, therefore preserving the hash value defining the index 137. In the example configuration, for example, the dedupe logic 142 identifies a chunk file 131 by a MOD function based on a constant independent of the number of storage volumes.

Accordingly, the dedupe system also redistributes files across storage volumes 170, by identifying, for each stored file 131, a hash value based on the contents of the file, and computing a storage volume based on a value independent of the number of available storage volumes, thus the value will not become obsolete when new storage volumes are added. The dedupe logic 142 than writes each stored file to the computed storage volume, thus avoiding inconsistency of using a MOD value based on the number of active or installed nodes/devices, which renders previous values inaccurate upon adding a new node or device.

Figure 5:
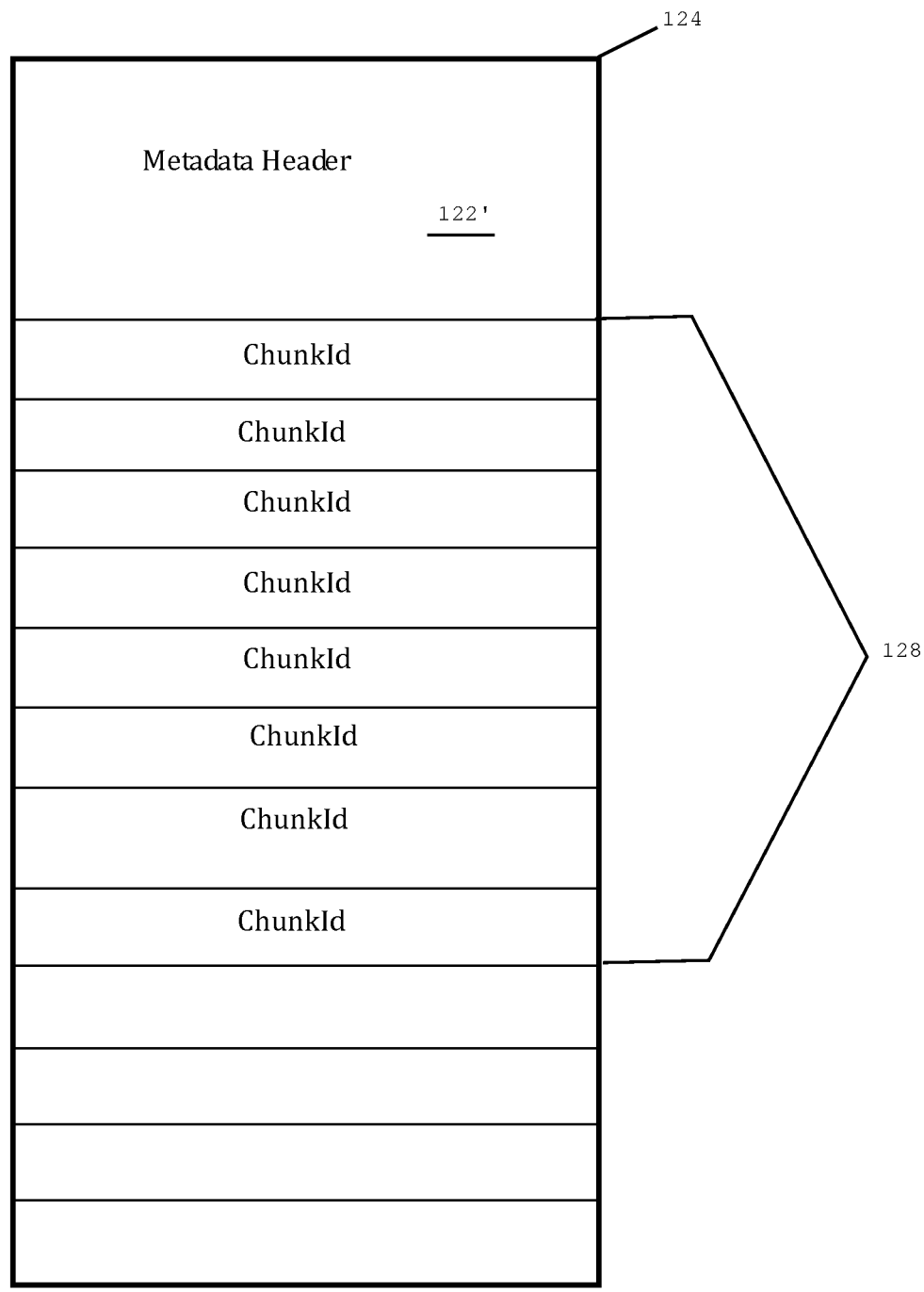
FIG. 5 shows metadata storage in the flash storage of FIG. 2.

FIG. 5 shows metadata storage in the flash storage of FIG. 2. Referring to FIGS. 2 and 5, the metadata file 124 includes a file header 122' including a filename, privileges and optional history and characteristics, and a sequence of chunk IDs 128. Each chunk ID is a unique representation of the data in the corresponding chunk, such as a hash value, used for comparison to identify chunks with the same data value. Each chunk ID may be incorporated in a lookup in the sorted list of chunk IDs 137 in the chunk index 133 to find the location 139 of the corresponding chunk 135.

The de-duplication module 140 is responsible for preserving the file semantics to the applications 144. When a new file is created, the de-duplication module 140 forwards the requests to the metadata module 120 where the file 124 is created according to the name and access permissions requested by the create request. Nothing is yet changed or modified in the chunk store 130. The algorithm to handle new writes requests is described in FIG. 5. If the offset and the length of the request are aligned at chunk 135 boundaries, the de-duplication module divides the IO request into fixed size chunks 135. It then calculates the chunk id 128 of each chunk. It then performs simple hash function on the chunk id of each chunk to identify the chunk file 131 that chunk 135 should be stored in. Such a hash function is employed as a placement algorithm.

The placement algorithm is not limited to a simple hash. A more sophisticated placement algorithm can replace it. For example in the computer literature a well know algorithm called CRASH can be used to find an optimal chunk file for a particular chunk. Once a chunk file 131 is identified for a chunk 135, the chunk 135 is first stored in the chunk store file. It includes identifying the free block in the chunk store file by examining the free bitmap 162, writing the chunk to the free location 135' and then updating the free bitmap 162. Chunk store file implementation will employ log/journal for consistent updates and performance enhancements. Once the chunk store file is successfully updated 134, the chunk id and the location of the chunk are stored in the index file 132 of the chunk file. Once the chunk file is successfully updated with index 139 and chunk id 137, the corresponding chunk id is stored at the respective offset of the metadata file 120 to complete the transaction.

Figure 6:
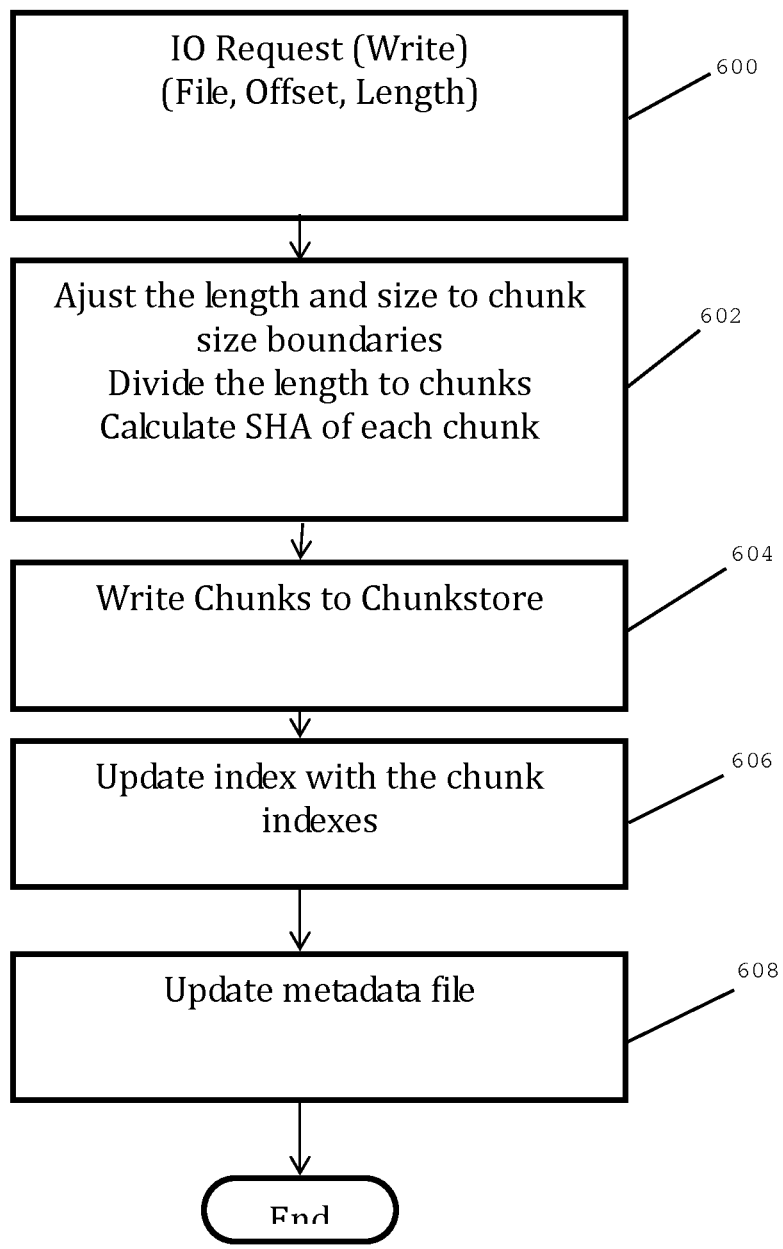
FIG. 6 is a flowchart of write request processing in the chunk store of FIG. 2.

FIG. 6 is a flowchart of write request processing in the chunk store of FIG. 2; As shown in block 600, an I/O request (e.g. Write) is received. The length and size are adjusted to chunk size boundaries, and the length is divided into chunk boundaries and the SHA of each chunk is calculated, as depicted in block 602. The dedupe logic 142 writes the chunks 135 to the chunkstore 130, as directed in block 604. The index 133 is updated the with the chunk indexes 139, as shown in block 606, and the metadata file 124 is updated, as directed in block 608.

Processing the write request, therefore involves receiving an I/O (input/output) request from an application 144, and identifying a filename 122 in the received request. The dedupe logic 142 identifies an entry in a metadata store 120 indicative of security settings of the file corresponding to the filename, and partitions the file into chunks 135 corresponding to the chunkstore 130.

The algorithm to handle write request to existing offset and length range is more complex. Since modifying the chunk result in new chunk IDs, the new chunk needs to be written to a different place and the chunk id location updated in the metadata 128. This operation may result in dangling chunks, which are not referenced by any chunk id in any metadata file and need to be reclaimed during garbage collection phase. The garbage collection algorithm is explained further below.

When the write request is not aligned with chunk 135 boundaries, it results in addition read requests. If the IO request result in a partial chunk update, the de-duplication module 140 will read the entire chunk 135 from the chunk store 130 as a normal read request and then applies the changes from the write request to the read chunk. The resulting chunk 135 is later written using the usual write algorithm as explained above.

In general, therefore, the method of processing the IO write request includes breaking the IO request into chunk sizes, calculating chunk ids per each chunk, finding a virtual chunk file using the placement algorithm and storing the chunk in the corresponding chunk file, updating the index with new chunk id and then updating the corresponding metadata file with new chunk ids in that order.

Figure 7:
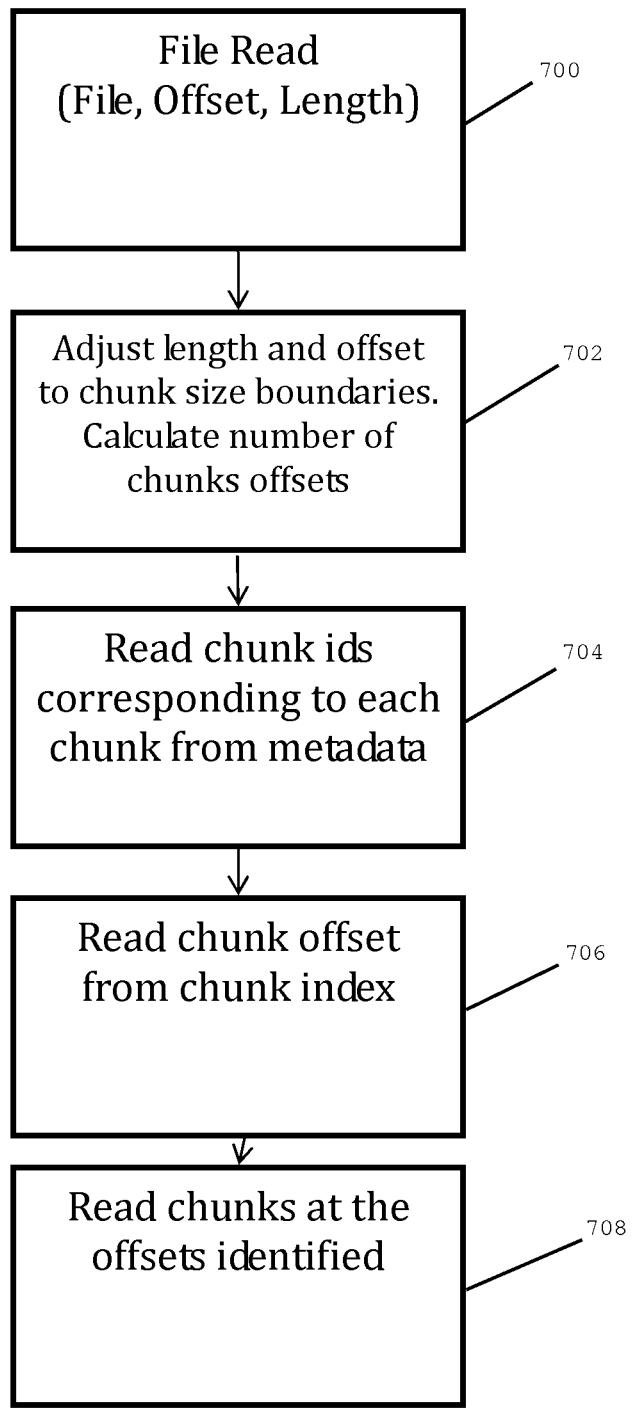
FIG. 7 is a flowchart of read request processing in the chunk store of FIG. 2.

The algorithm to handle read requests is described in FIG. 7. The read algorithm performs the operations in reverse order of write operation. A de-duplication translator in the dedupe logic 142 first calculates the offset and the number of chunks to be read from the read request offset and length. If the read request is not aligned at chunk size boundaries, the offset is adjusted to floor of chunk size. If the resulting offset+size is not aligned to chunk size, then size is adjusted to the ceiling of the chunk size and then the offset into metadata and the number of chunk ids to be read are calculated based on newly computed offset and length.

The chunk file 131 corresponding to each chunk id 128 is calculated based on the placement algorithm. Once the chunk file 131 is identified, the chunk location is determined by looking up the chunk id from the index file and then the chunk data retrieved from the chunk offset 139. This process is repeated for all chunks 135 associated with the file 126 in the read request.

If the offset and length were adjusted for alignment, the effective buffer size is adjusted based on the offset and length adjustments that we made at the beginning of the read request processing. This effectively completes the read IO request processing.

FIG. 7 is a flowchart of read request processing in the chunk store of FIG. 2; and As shown in box 700, a file read request is received, indicative of file, i.e. Offset and Length in the metadata 120. The dedupe logic 142 adjusts the length and offset to chunk size boundaries and calculate the number of chunks offsets, as disclosed in box 702. The dedupe logic 142 read chunk IDs 128 corresponding to each chunk 135 from the metadata 120, as directed in box 704. The corresponding chunk offset 139 is then read from the chunk index 133, as depicted in box 706. The chunks 135 are then read at the identified offsets, as shown at box 708.

In general, the method of processing the IO read request includes identifying the chunk id offsets corresponding to IO request in the metadata file, retrieving the chunk ids and identifying the virtual chunk file based on the chunk placement algorithm and then retrieving the chunks from the virtual chunk file and completing the IO read request Garbage collection of chunks in a de-duplication file system is the process of reclaiming unused storage by freeing the storage that unreferenced chunks are consuming. Usually each chunk 135 in the chunk store 130 is referenced by one or more chunk ids 128 in metadata files. But when an existing chunk 135 is modified by a write operation or when a file is deleted, old chunks may become unreferenced. However we don't know for certain if the old chunk is unreferenced or not until we check each metadata file to make sure that no metadata file has a corresponding chunk id. The processing of determining if a chunk is referenced or not and then deleting the chunk from the chunk store is referred to as garbage collection.

There are two ways a chunk can be unreferenced:
1. When a file is deleted which result in the corresponding metadata file is deleted
2. When a chunk is overwritten which means the new chunk will result in new chunk id and a new chunk. The chunk that corresponds to old chunk id may become unreferenced.

The dedupe logic 142 maintains keeps an area in the metadata module to store all "potentially unreferenced" chunk ids that result in when a file is deleted or over written with new data. Once the number of these chunk ids crosses a predefined threshold, the file system invokes a garbage collection process. The garbage collection process is a background process. This process synchronizes with write the algorithm. The garbage collection process works as described in FIG. 8. The garbage collection process iterates through all the metadata files 126. If a chunk id 128 in a metadata file matches with one of the chunk ids in "potentially unreferenced" chunk ids, that chunk id is dropped from the "potentially unreferenced" chunk id list. Also any new chunk ids 128 that match with "potentially unreferenced" chunk ids, those chunk ids are dropped as well. When the garbage collection process completes its iteration, the chunk ids that left in the "potentially unreferenced" list are chunks that are unreferenced and such chunks may be deleted from the chunk store to reclaim storage.

Therefore, the dedupe system also performs a method for writing updates, including identifying an ordered set of identifiers, or chink ids 128 corresponding to the file 122, and determining which identifiers in the ordered set have changed based on modifications made to the chunks corresponding to the identifiers, i.e. which parts of the file are modified. The dedupe logic 142 stores the changed identifiers in the ordered set to correspond to the changed file, and marks chunks no longer referenced by the ordered set as deleted.

Figure 8:
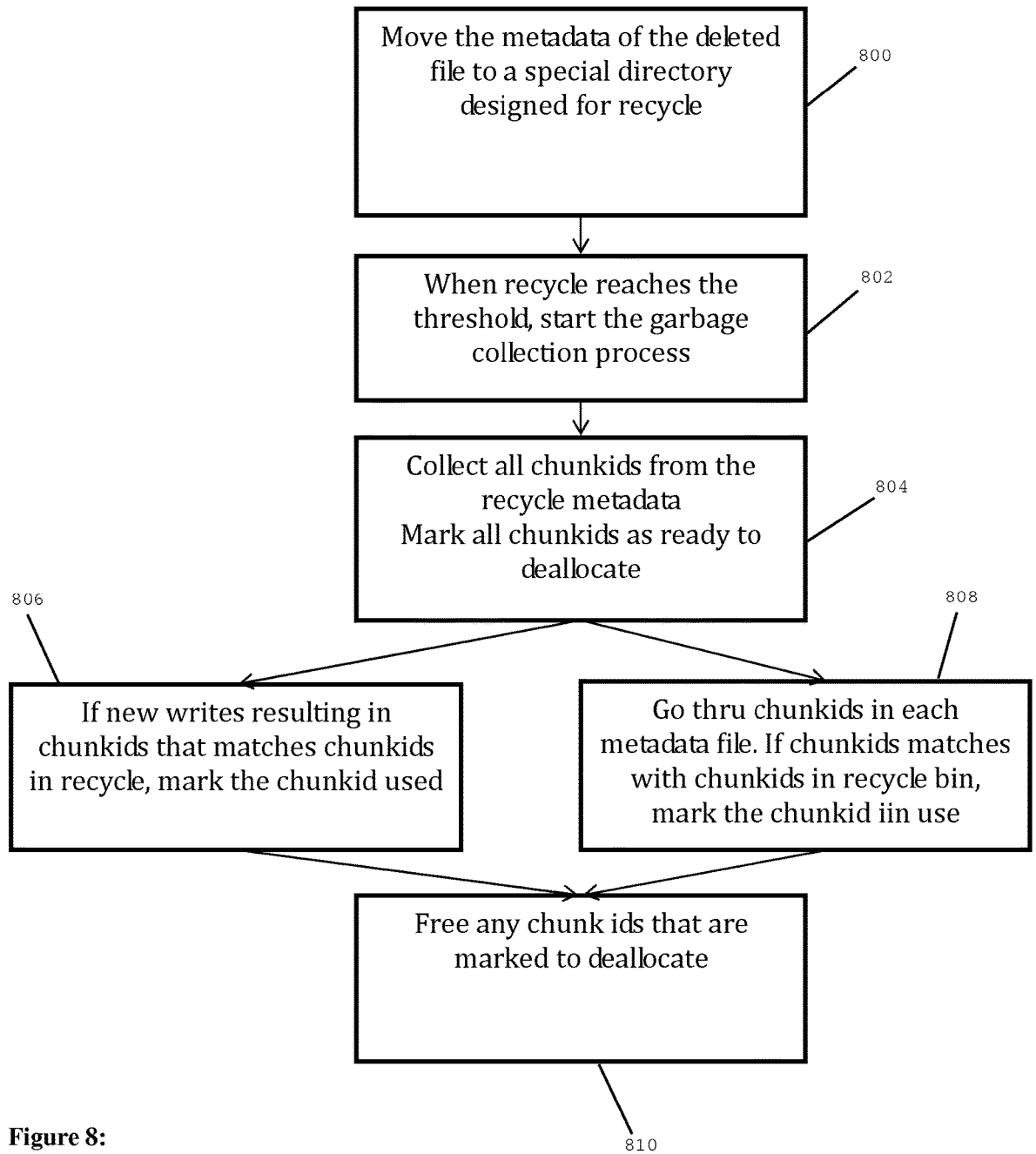
FIG. 8 is a flowchart of garbage collection processing in the chunk store of FIG. 2.

FIG. 8 is a flowchart of garbage collection processing in the chunk store of FIG. 2.

As directed in box 800, upon a file deletion, the metadata of the deleted file is moved to a recycling directory. When recycling reaches the threshold, start the garbage collection process, as depicted in box 802. All chunk IDs 126 are collected from the recycled metadata, as directed in step 804, and all chunk IDs are marked as ready to de-allocate. As disclosed in box 806, if new writes resulting in chunk IDs match chunk IDs in the recycling directory, the chunk ID is marked as used. As shown in box 808, the process goes through chunk IDs in each metadata file. If the chunk IDs matches with chunk IDs in the recycle bin, the chunk ID is marked as "in use." Upon completion of iteration through all used chunk IDs, as directed in box 810, the dedupe logic 142 frees any chunk IDs that are still marked for deallocation.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a storage environment having at least one file defined as a sequence of chunks, each chunk defining a portion of data in the file, a method of storing data, comprising:
   subdividing the file into a sequence of chunks;
   computing an identifier for each chunk to generate a sequence of identifiers having chunk values, each of the identifiers in the sequence unlikely to have a similar chunk value for a chunk of dissimilar contents;
   storing each unique chunk value in a chunkstore, the chunkstore defined by a memory region for storing portions of the file;
   identifying a chunk location for each stored chunk value;
   invoking a garbage collection process, comprising:
      identifying an ordered set of identifiers corresponding to the file;
      determining which identifiers in the ordered set have changed based on modifications made to chunks corresponding to the identifiers;
      storing the changed identifiers in the ordered set to correspond to the changed file;
      marking chunks no longer referenced by the ordered set as deleted;
      aggregating the identifiers corresponding to the chunks marked as deleted;
      designating, from the aggregated identifiers, chunks still in use from other files;
      upon iterating through all files still in use, deallocating the chunks corresponding to aggregated identifiers not designated as still in use;
      storing the aggregated identifiers in a sequence as being candidates for deallocation;
      removing, during the iteration, designated identifiers from the stored sequence;
      identifying new writes that reference the aggregated identifiers; and
      updating a bitmap of available chunks based on the remaining designated identifiers and the identified new writes; and
   storing, for each identifier, an index of the chunk location associated with the corresponding identifier, the stored index for similar chunk identifiers pointing to the same chunk location, further comprising redistributing files across storage volumes, including:
      identifying, for each stored file, a hash value based on the contents of the file;
      computing a storage volume based on a value independent of the number of available storage volumes; and
      writing the stored chunk and index for each stored file to the computed storage volume.

2. The method of claim 1 further comprising:
   removing duplicate chunks by comparing the identifier for each chunk with the identifiers of previously stored chunks to identify chunks having the same value; and
   storing an index to the chunks having the same value from each of the similar identifiers.

3. The method of claim 2 wherein the chunkstore has a latency greater than the metadata.

4. The method of claim 1 wherein the identifier is a hash computed based on the value of data in the chunk.

5. The method of claim 4 wherein each of the chunks define a similarly sized portion of the file and identifiers corresponding to the chunks are arranged sequentially to compose the contents of the file.

6. The method of claim 1 further comprising identifying a storage volume for storing the chunk in the chunkstore by a function independent of the number of storage volumes.

7. The method of claim 6 further comprising identifying a chunk file by a MOD function based on a constant independent of the number of storage volumes.

8. The method of claim 1 further comprising:
   receiving an I/O (input/output) request from an application;
   identifying a filename in the received request;
   identifying an entry in a metadata store indicative of security settings of the file corresponding to the filename; and
   partitioning the file into chunks corresponding to the chunkstore.

9. The method of claim 1 further comprising:
   determining a duplicate chunk of data in a different file based on matching hash values; and
   storing corresponding indexes for each file having a duplicate chunk to point to the same chunk location.

10. A deduplication (dedupe) file system, comprising:
    an interface to applications on a host computing system of a user;
    a dedupe layer responsive to the application for subdividing a file into a sequence of chunks, and computing an identifier for each chunk to generate a sequence of identifiers having chunk values, each of the identifiers in the sequence unlikely to have a similar chunk value for a chunk of dissimilar contents;
    a chunkstore configured for storing each unique chunk value in a chunkstore, the chunkstore defined by a memory region for storing portions of the file;
    dedupe logic in the dedupe layer for identifying a chunk location for each stored chunk value and invoking a garbage collection process, comprising:
       identifying an ordered set of identifiers corresponding to the file;
       determining which identifiers in the ordered set have changed based on modifications made to chunks corresponding to the identifiers;
       storing the changed identifiers in the ordered set to correspond to the changed file;
       marking chunks no longer referenced by the ordered set as deleted;
       aggregating the identifiers corresponding to the chunks marked as deleted;

designating, from the aggregated identifiers, chunks still in use from other files;

upon iterating through all files still in use, deallocating the chunks corresponding to aggregated identifiers not designated as still in use;

storing the aggregated identifiers in a sequence as being candidates for deallocation;

removing, during the iteration, designated identifiers from the stored sequence;

identifying new writes that reference the aggregated identifiers; and updating a bitmap of available chunks based on the remaining designated identifiers and the identified new writes; and an index portion in the chunkstore for storing, for each identifier, an index of the chunk location associated with the corresponding identifier, the stored index for similar chunk identifiers pointing to the same chunk location, the dedupe logic further operable to redistribute files across storage volumes by:

identifying, for each stored file, a hash value based on the contents of the file;

computing a storage volume based on a value independent of the number of available storage volumes; and writing the stored chunk and index for each stored file to the computed storage volume.

11. The file system of claim 10 wherein the dedupe logic is configured for:

removing duplicate chunks by comparing the identifier for each chunk with the identifiers of previously stored chunks to identify chunks having the same value; and storing an index to the same chunk having the same value from each of the similar identifiers.

12. The file system of claim 11 wherein the chunkstore is rotational memory having a latency greater than metadata portion stored on a flash memory.

13. The file system of claim 12 wherein the identifier is a hash computed based on the value of data in the chunk.

14. The file system of claim 13 wherein each of the chunks define a similarly sized portion of the file and identifiers corresponding to the chunks are arranged sequentially to compose the contents of the file.

15. The file system of claim 10 wherein the dedupe logic is configured to compute a storage volume for storing the chunk in the chunkstore by a function independent of the number of storage volumes.

16. The file system of claim 15 wherein the dedupe logic is configured to compute a location of a chunk file by a MOD function based on a constant independent of the number of storage volumes.

17. The file system of claim 10 wherein the dedupe logic is further configured to receive an I/O (input/output) request from an application;
identify a filename in the received request;
identify an entry in a metadata store indicative of security settings of the file corresponding to the filename; and
partition the file into chunks corresponding to the chunkstore.

18. A computer program product on a non-transitory computer readable storage medium having instructions that, when executed by a processor, perform a method for implementing a de-duplication file system by separating a file into metadata and chunks, where file data is divided into a fixed number of chunks and a message digest of each chunk is stored in the metadata, the method comprising:

subdividing the file into a sequence of chunks;

computing an identifier for each chunk to generate a sequence of identifiers having chunk values, each of the identifiers unlikely to have a similar chunk value for a chunk of dissimilar contents;

storing each unique chunk value in a chunkstore, the chunkstore defined by a memory region for storing portions of the file;

identifying a chunk location for each stored chunk value;

invoking a garbage collection process, comprising:

identifying an ordered set of identifiers corresponding to the file;

determining which identifiers in the ordered set have changed based on modifications made to chunks corresponding to the identifiers;

storing the changed identifiers in the ordered set to correspond to the changed file;

marking chunks no longer referenced by the ordered set as deleted;

aggregating the identifiers corresponding to the chunks marked as deleted;

designating, from the aggregated identifiers, chunks still in use from other files;

upon iterating through all files still in use, deallocating the chunks corresponding to aggregated identifiers not designated as still in use;

storing the aggregated identifiers in a sequence as being candidates for deallocation;

removing, during the iteration, designated identifiers from the stored sequence;

identifying new writes that reference the aggregated identifiers; and updating a bitmap of available chunks based on the remaining designated identifiers and the identified new writes; and storing, for each identifier, an index of the chunk location associated with the corresponding identifier, the stored index for similar chunk identifiers pointing to the same chunk location, further comprising redistributing files across storage volumes, including:

identifying, for each stored file, a hash value based on the contents of the file;

computing a storage volume based on a value independent of the number of available storage volumes; and writing the stored chunk and index for each stored file to the computed storage volume.

19. The computer program product of claim 18 wherein the method further comprises storing, in a metadata portion, an ordered sequence of the computed identifiers representing contents of the file.

* * * * *